(12) United States Patent
Saleh et al.

(10) Patent No.: US 10,711,586 B2
(45) Date of Patent: *Jul. 14, 2020

(54) MULTI-INLET FRACK HEAD SYSTEM

(71) Applicant: GE Oil & Gas Pressure Control LP, Houston, TX (US)

(72) Inventors: Shadi Moaness Saleh, Houston, TX (US); Timothy Fuller, Houston, TX (US); Fauad Saleem, Houston, TX (US); Gajanan Hegde, Houston, TX (US); Saurabh Kajaria, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,009

(22) Filed: May 7, 2019

(65) Prior Publication Data

US 2019/0257186 A1  Aug. 22, 2019

Related U.S. Application Data

(63) Continuation of application No. 15/874,314, filed on Jan. 18, 2018, now Pat. No. 10,294,766.

(Continued)

(51) Int. Cl.
*E21B 33/038* (2006.01)
*E21B 33/068* (2006.01)
(Continued)

(52) U.S. Cl.
CPC ............ *E21B 43/26* (2013.01); *E21B 33/038* (2013.01); *E21B 33/068* (2013.01); *F16L 41/02* (2013.01)

(58) Field of Classification Search
CPC ...... E21B 33/038; E21B 33/068; E21B 43/26; F16L 41/02
See application file for complete search history.

(56) References Cited

U.S. PATENT DOCUMENTS 1,659,452 A * 2/1928 Welton .................... E21B 33/03
138/37
4,169,504 A * 10/1979 Scott ..................... E21B 33/068
166/90.1

(Continued)

FOREIGN PATENT DOCUMENTS

| CN | 105350949 | 2/2016 |
| CN | 205400695 | 7/2016 |
| WO | 2013/133874 | 9/2013 |

OTHER PUBLICATIONS

International Search Report and Written Opinion issued in connection with corresponding PCT Application No. PCT/US2018/014197 dated Apr. 10, 2018.

*Primary Examiner* — Matthew R Buck
(74) *Attorney, Agent, or Firm* — Hogan Lovells US LLP (57) ABSTRACT

Embodiments of the present disclosure include a multi-inlet fracturing head (MIFH) having a first inlet channel extending through a body of the MIFH, the first inlet channel being substantially perpendicular to an axis of the MIFH and directing fluid into a first flow passage of the MIFH. The MIFH also includes a second inlet channel extending through the body of the MIFH, the second inlet channel being at an angle relative to the axis and directing fluid into the first flow passage of the MIFH.

17 Claims, 8 Drawing Sheets

Related U.S. Application Data

(60) Provisional application No. 62/448,042, filed on Jan. 19, 2017.

(51) Int. Cl.
*E21B 43/26* (2006.01)
*F16L 41/02* (2006.01)

(56) References Cited

U.S. PATENT DOCUMENTS

| | | | |
|---|---|---|---|
| 6,457,530 B1 * | 10/2002 | Lam | E21B 33/068 166/242.5 |
| 6,575,247 B2 * | 6/2003 | Tolman | E21B 33/068 166/305.1 |
| 7,478,673 B2 * | 1/2009 | Boyd | E21B 33/068 166/177.5 |
| 8,100,175 B2 | 1/2012 | McGuire | |
| 8,496,062 B2 * | 7/2013 | Kajaria | E21B 21/062 166/177.5 |
| 8,656,990 B2 | 2/2014 | Kajaria | |
| 8,770,277 B2 | 7/2014 | Artherholt | |
| 8,944,159 B2 | 2/2015 | Guidry | |
| 9,175,556 B2 | 11/2015 | Cherewyk | |
| 10,294,766 B2 * | 5/2019 | Saleh | E21B 43/26 |
| 2011/0048695 A1 | 3/2011 | Cherewyk | |
| 2011/0048698 A1 | 3/2011 | McGuire | |
| 2015/0184491 A1 | 7/2015 | Kajaria | |
| 2016/0060997 A1 * | 3/2016 | Thomas | E21B 43/267 166/88.4 |
| 2016/0168970 A1 | 6/2016 | Kajaria | |
| 2017/0002620 A1 * | 1/2017 | Roesner | E21B 33/068 |
| 2017/0234097 A1 * | 8/2017 | Wright | E21B 17/22 166/90.1 |

* cited by examiner

MULTI-INLET FRACK HEAD SYSTEM

CROSS-REFERENCE TO RELATED APPLICATIONS

This application is a continuation of U.S. patent application Ser. No. 15/874,314 filed Jan. 18, 2018, titled "MULTI-INLET FRACK HEAD SYSTEM," now U.S. Pat. No. 10,294,766, issued May 21, 2019, and claims the benefit of U.S. Provisional Application No. 62/448,042 filed Jan. 19, 2017, titled "Optimized Multi-Inlet Frack Head Design," both of which are incorporated by reference in their entirety.

BACKGROUND

1. Field of the Invention

The present disclosure relates in general to hydraulic fracturing operations and in particular to a multi-inlet frack head system.

2. Description of Related Art

During hydraulic fracturing operations an inlet head may be arranged on a well to direct high-pressure fracturing fluid into a wellbore. The inlet head may receive the fracturing fluid from a variety of sources and be arranged to receive the fluid at different angles positioned on multiple faces of the inlet head. In operation, the fracturing fluid enters a passage within the inlet head and is directed into the wellbore. However, the fracturing fluid may include entrained solids, such as fracturing proppant, that erode components of the inlet head. Furthermore, the orientation of openings on the multiple faces may exacerbate erosion, thereby leading to premature failure of the inlet head.

SUMMARY

Applicants recognized the problems noted above herein and conceived and developed embodiments of systems and methods, according to the present disclosure, for multi-inlet frack head systems.

In an embodiment a multi-inlet fracturing head (MIFH) for directing a high pressure fracturing fluid into a wellbore includes a plurality of angled faces at an angle relative to a longitudinal axis of the MIFH, each angled face having an inlet for receiving the fracturing fluid. The MIFH also includes a plurality of vertical faces positioned radially about the axis, a vertical face of the plurality of vertical faces being at least partially between adjacent angled faces of the plurality of angled faces, and each vertical face having an inlet for receiving the fracturing fluid. The MIFH further includes a flow path within a body of the MIFH, the flow path receiving the fluid from the respective inlets of the angled faces and the vertical faces, wherein a first fluid flow from the vertical faces contacts a second fluid flow from the angled faces within the flow path.

In another embodiment a multi-inlet fracturing head (MIFH) for directing a high pressure fracturing fluid into a wellbore includes a first inlet channel extending through a body of the MIFH, the first inlet channel being substantially perpendicular to an axis of the MIFH and directing fluid into a first flow passage of the MIFH. The MIFH also includes a second inlet channel extending through the body of the MIFH, the second inlet channel being at an angle relative to the axis and directing fluid into the first flow passage of the MIFH. The MIFH further includes a second flow passage coupled to the first flow passage, the second flow passage downstream of the first flow passage and having a smaller diameter than the first flow passage. The MIFH includes a transition between the first flow passage and the second flow passage, the transition gradually reducing a difference in diameter between the first flow passage and the second flow passage.

In an embodiment a system for performing hydraulic fracturing operations on a wellbore includes a casing head, a fracturing tree coupled to the casing head, and a multi-inlet fracturing head (MIFH) arranged at a top portion of the fracturing tree. The MIFH receives a high pressure fracturing fluid from a source and directs the high pressure fracturing fluid into the wellbore. The MIFH includes a first inlet channel extending through a body of the MIFH for directing fluid into a first flow passage, a second inlet channel extending through the body of the MIFH for directing fluid into the first flow passage, and the first and second inlet channels are arranged at different angles with respect to an axis of the MIFH.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a multi-inlet frack head (MIFH) for directing a high-pressure fracturing fluid into a wellbore. In various embodiments, the MIFH includes a plurality of inlets for directing the fluid into a body of the MIFH for flow into the wellbore. The plurality of inlets may be spaced radially about the MIFH and at a variety of heights and radial locations to facilitate coupling of various piping or tubular components to the MIFH without interference with adjacent components. Furthermore, the spacing may enable multiple components to be coupled to the MIFH at once, thereby reducing the time for installation. In various embodiments, the inlets are arranged at different angles relative to an axis of the MIFH. For example, inlets may be arranged substantially perpendicular to the axis and also at an angle relative to the axis. The staggered angles facilitate absorption and control of fluid velocities within the body of the MIFH, thereby reducing the likelihood of erosion. By way of example only, a fluid inlet may be arranged at a downward angle to direct fluid into the body and a second fluid inlet may be arranged substantially perpendicular to the axis. As the fluids interact with the body, forces from each fluid flow may be absorbed due to interaction of the fluid flows. Reducing the forces associated with the fluid flows may correspond to reduced erosion within the body of the MIFH. Accordingly, the life of the MIFH may be increased thereby increasing efficiency at the well site and reducing costs.

Figure 1:
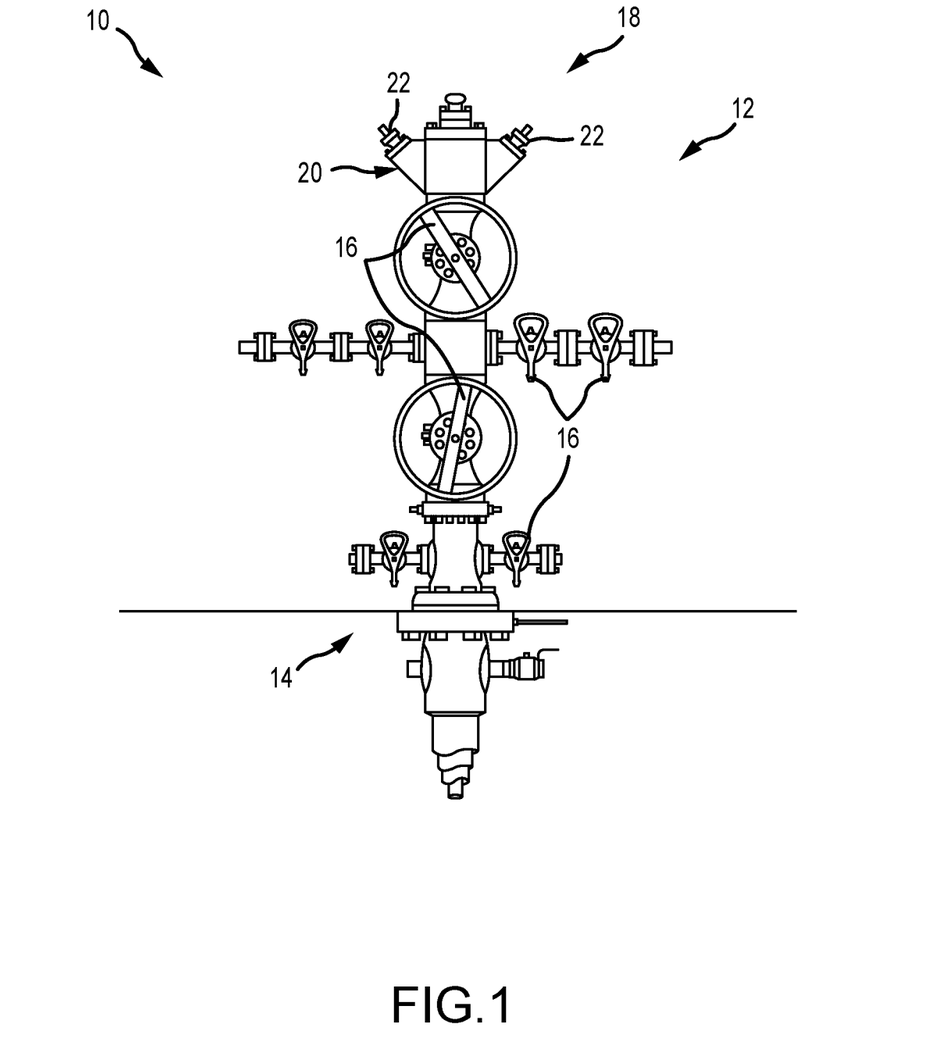
FIG. 1 is a schematic side elevational view of a wellhead system, in accordance with embodiments of the present disclosure.

FIG. 1 is schematic side elevational view of an embodiment of a wellhead system 10 that may be utilized for hydraulic fracturing. The illustrated wellhead system 10 includes a frac tree 12 arranged on a casing head 14. The frac tree 12 includes valves 16 for controlling a flow of fluid, such as fracturing fluid, into the wellbore. For example, the valves 16 may include master valves, gate valves, wing valves, and the like. At a top portion 18 of the frac tree 12 is an inlet head 20, which may be referred to as a goat head. The inlet head 20 receives fracturing fluid at a high pressure from pumps at various connections 22 distributed around the inlet head 20. As a result, the fracturing fluid can be directed toward the wellbore via the frac tree 12.

In various embodiments, the inlet head 20 may suffer from erosion and degradation due to the entrained particles, which may be fracturing proppant, within the fracturing fluid. Furthermore, pressure changes, directional changes, and velocity changes within the inlet head 20 may further damage portions of the inlet head 20. In operation, if leaks or problems occur with the inlet head 20 entire fracturing operations may be shut down, thereby reducing efficiencies and increasing costs at the well site. Embodiments of the present disclosure are directed toward a multi-inlet frack head configured to reduce internal erosion compared to traditional inlet heads. Accordingly, the multi-inlet frack heads may last longer and reduce the likelihood of shutdowns or problems at the well site.

Figure 2:
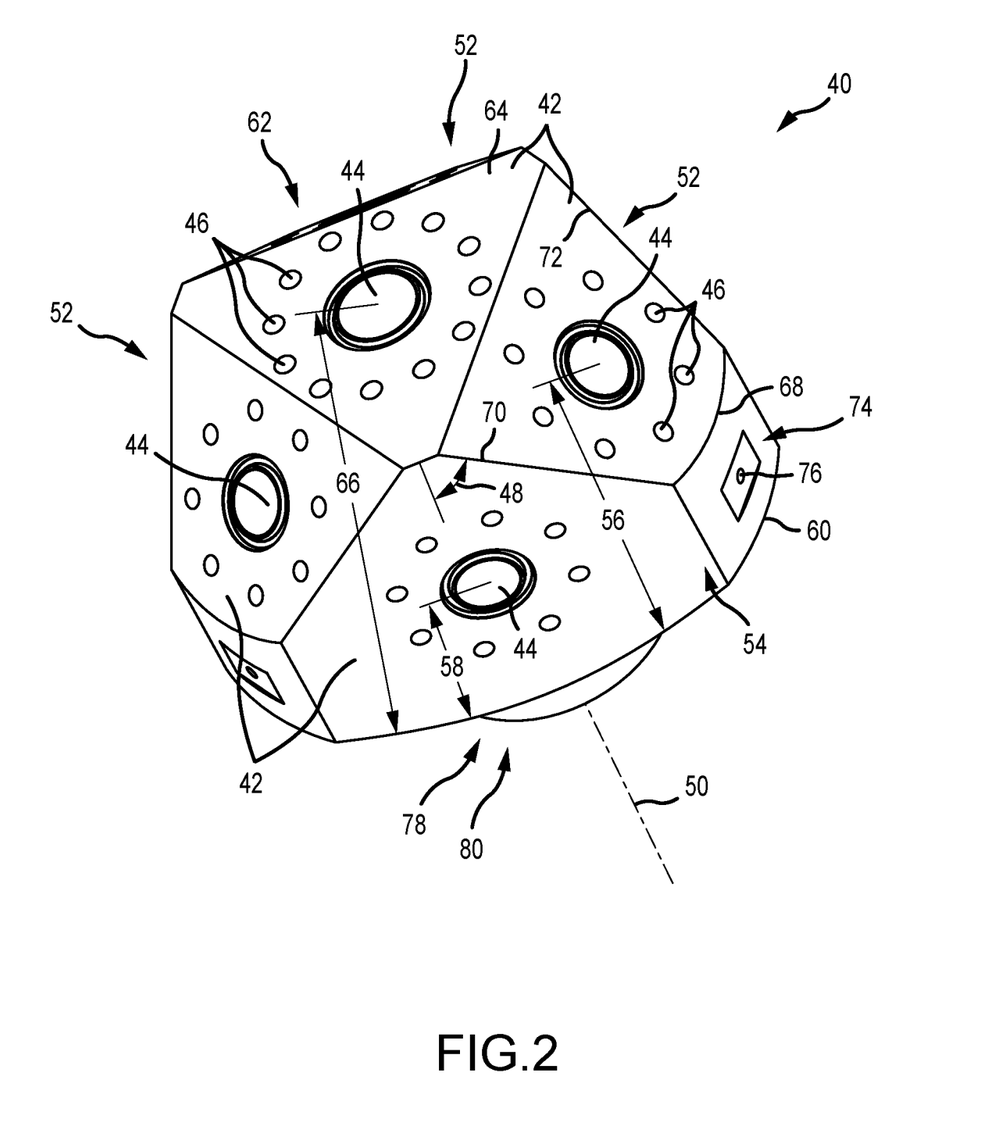
FIG. 2 is a front perspective view of an embodiment of a multi-inlet frack head (MIFH), in accordance with embodiments of the present disclosure.

FIG. 2 is a perspective view of an embodiment of a multi-inlet frack head 40 (MIFH). As illustrated in FIG. 1, the MIFH 40 may be arranged near a top portion of the frac tree 12 and be coupled to various piping or associated measurement devices. In the illustrated embodiment, the MIFH 40 includes a plurality of faces 42, each having an inlet 44. The illustrated inlets 44 are substantially circular, but it should be appreciated that in other embodiments the inlets 44 may be elliptical or any other reasonable shape. In various embodiments, the inlets 44 may be standardized sizes in order to accommodate oil field equipment for distributing fracturing fluid. For example, the inlets 44 may be approximately 4 inches in diameter. However, it should be appreciated that in other embodiments the inlets 44 may be different diameters. For example, the inlets 44 may be approximately 3 inches in diameter, approximately 5 inches in diameter, approximately 6 inches in diameter, or the like. The faces 42 further include apertures 46, which may receive one or more fasteners to facilitate coupling of tubular equipment to the MIFH 40. For example, the tubing may be directed to the MIFH 40 from a missile or manifold containing high-pressure fracturing fluid.

The illustrated faces 42 are arranged at an angle 48 relative to a longitudinal axis 50 of the MIFH 40. As will be described below, the angle 48 may be approximately 45 degrees, in various embodiments. In The illustrated embodiment includes three angled faces 52 (the third being obscured due to the orientation of the figure), each arranged at the angle 48. It should be appreciated that in various embodiments there may be more or fewer angled faces 52. Additionally, each of the angled faces 52 may not be arranged at the same angle 48. That is, the angled faces 52 may be arranged at a variety of angles to facilitate coupling of the tubular equipment to the MIFH 40. Furthermore, as will be described below, the angle 48 may be particularly selected to direct the fracturing fluid into the MIFH 40 at a certain angle to reduce the likelihood of erosion within the MIFH 40.

The illustrated embodiment further includes three vertical faces 54 (two of the vertical faces being obscured due to the orientation of the figure). The vertical faces 54 may be substantially parallel to the axis 50, and as a result the fluid directed through the inlets 44 of the vertical faces 54 may enter the MIFH 40 at approximately 90 degrees relative to the axis 50 (e.g., substantially perpendicular). However, it should be appreciated that while the illustrated embodiment shows the vertical faces 54 at approximately 90 degrees relative to the axis 50, in other embodiments the vertical faces 54 may be arranged at a different angle relative to the axis 50. In various embodiments, the vertical faces 54 and the angled faces 52 are at different angles. Accordingly, as will be described below, interaction of the respective fluid from each of the inlets 44 may reduce the likelihood of erosion within the MIFH 40. The vertical faces 54 are arranged between the angled faces 52 and at a lower elevation. That is, the inlets 44 on the angled faces are at a first height 56 and the inlets 44 on the vertical faces 54 are at a second height 58, where the first height 56 is greater than the second height 58. In embodiments, the first height 56 may be approximately 26 inches, relative to a bottom of the MIFH 40. Furthermore, the second height 58 may be approximately 19 inches, relative to the bottom of the MIFH 40. Accordingly, the interaction of fluids from the respective angled faces 52 and vertical faces 54 may be at a different plane within the MIFH 40, as will be described below. Furthermore, in the illustrated embodiment the heights 56, 58 are shown relative to a center line of the inlets 44. This staggered arrangement, as will be described below, facilitates mixing and dissipation of forces within a MIFH body 60. The MIFH body 60 may be formed from metallic components, such as steels (e.g., carbon steel, stainless steels, steel alloys, etc.); alloy materials, or the like. In various embodiments, components of the MIFH body 60 may be treated to accommodate operating conditions (e.g., NACE service) and the like. Furthermore, coupling of the tubing components may be simplified due to the increased space between adjacent couplings. Additionally, as will be described below, the arrangement of the various faces 42 enables operators to balance flow within the MIFH 40 even when all inlets are not in use.

FIG. 2 further illustrates an upper face 62 positioned at a top 64 of the MIFH 40. The upper face 62 includes the inlet 44 and is at a third height 66, which is greater than both the first and second heights 56, 58. In various embodiments, the third height 66 is approximately 31 inches. In various operations, the inlet 44 may be utilized to couple auxiliary components, such as pressure gauges, relief valves, or the like. However, in embodiments, fracturing fluid may be introduced into the body 60 via the inlet 44 on the upper face 62.

The illustrated faces 42 are arranged to contact at least one adjacent face along at least one side. That is, in the illustrated embodiment, the vertical face 54 contacts adjacent angled faces 48 and the upper face 62. Furthermore, as shown, each of the illustrated faces 42 has a different shape, however it should be appreciated that in other embodiments the faces 42 may have the same shape. For example, the angled faces 48 are substantially triangular, but with a rounded edge 68 joining the legs 70, 72. Additionally, the upper face 62 is also substantially triangular, however the points at the junctions between the legs have been squared off. The illustrated vertical face 54 is a hexagon, having a generally triangular upper portion and generally rectangular lower portion. It should be appreciated that the illustrated shapes are for example only and are not intended to be limiting. The general shape of each respective face 42 may be any polygonal, arcuate, or other shape to facilitate coupling of associated tubing components and also provide sufficient pressure containing properties.

As shown in the illustrated embodiment, the MIFH 40 further includes cut outs 74 and holes 76, which may be tapped holes for receiving one or more fasteners. The cut outs 74 may facilitate coupling additional components to the MIFH 40. Further, the cut outs 74 may be utilized to attach lifting lugs or other components for installation and removal of the MIFH 40 from the frac tree 12. It should be appreciated that the cut outs 74 may be arranged between the vertical faces 54 and aligned with the angled faces 52, as shown in the illustrated embodiment. However, any reasonable location for the cut outs 74 may be utilized. Furthermore, while the illustrated embodiment includes single cut outs for each respective angled face 52, in other embodiments there may be more cut outs 74 or fewer (e.g., zero) cut outs 74. Further illustrated is a mating component 78 at a bottom 80 of the MIFH 40. The mating component 78 may be a flanged component utilized to couple the MIFH 40 to other components of the frac tree 12.

Figure 3:
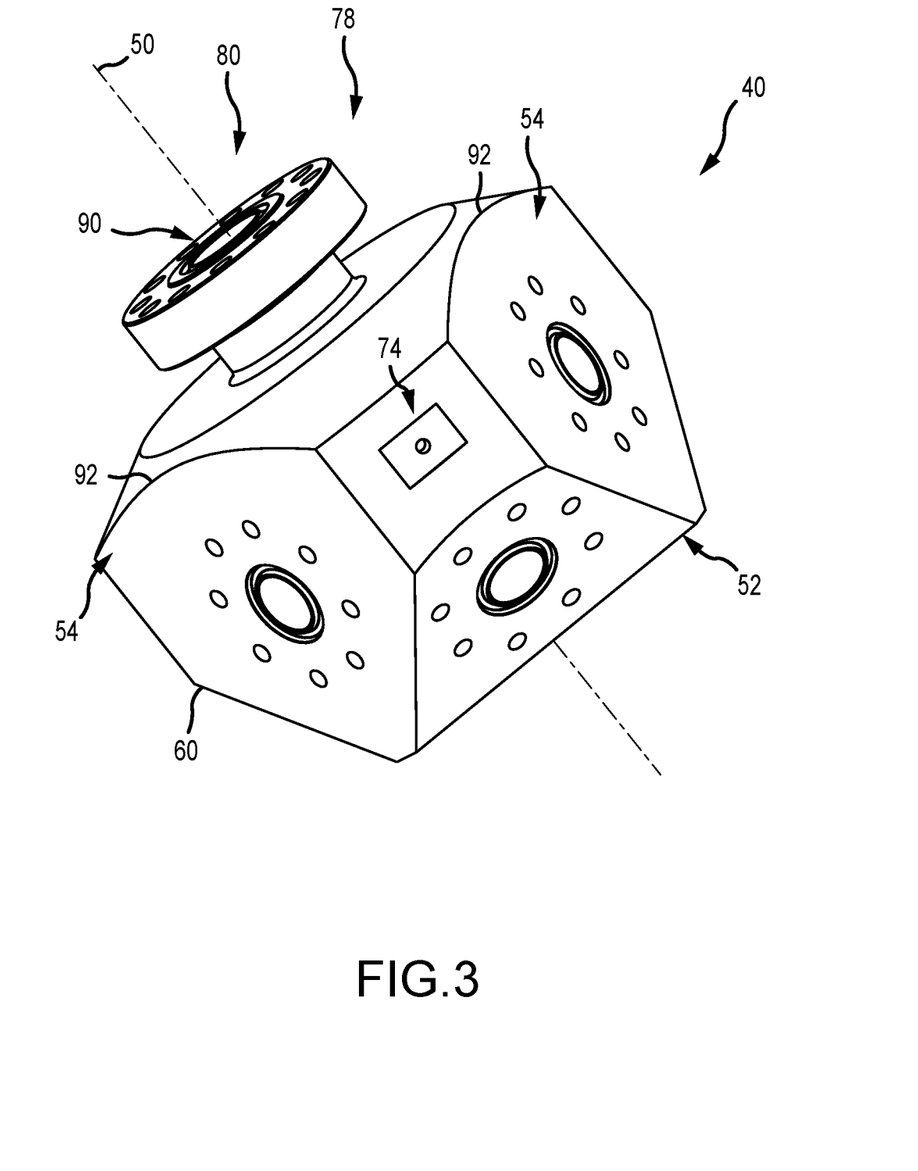
FIG. 3 is a bottom perspective view of an embodiment of a MIFH, in accordance with embodiments of the present disclosure.

FIG. 3 is a bottom perspective view of the MIFH 40 illustrating the mating component 78. The illustrated mating component 78 is a flange arranged at the bottom 80. The mating component 78 is substantially aligned along the axis 50 and directs fracturing fluid introduced into the body 60 through the frac tree 12 via an outlet 90.

As described above, the illustrated MIFH 40 includes the vertical faces 54 with the angled face 52 arranged therebetween. Additionally, the illustrated cut out 74 is positioned between the vertical faces 54. FIG. 3 further illustrates a rounded bottom 92 of the vertical faces 54. As mentioned herein, the shape of the respective faces 42 may be particularly selected due to pressure containing considerations, space restrictions, or the like. Further, while the illustrated embodiment includes the rounded bottom 92 other embodiments may have differently shaped portions of the vertical faces 54.

Figure 4:
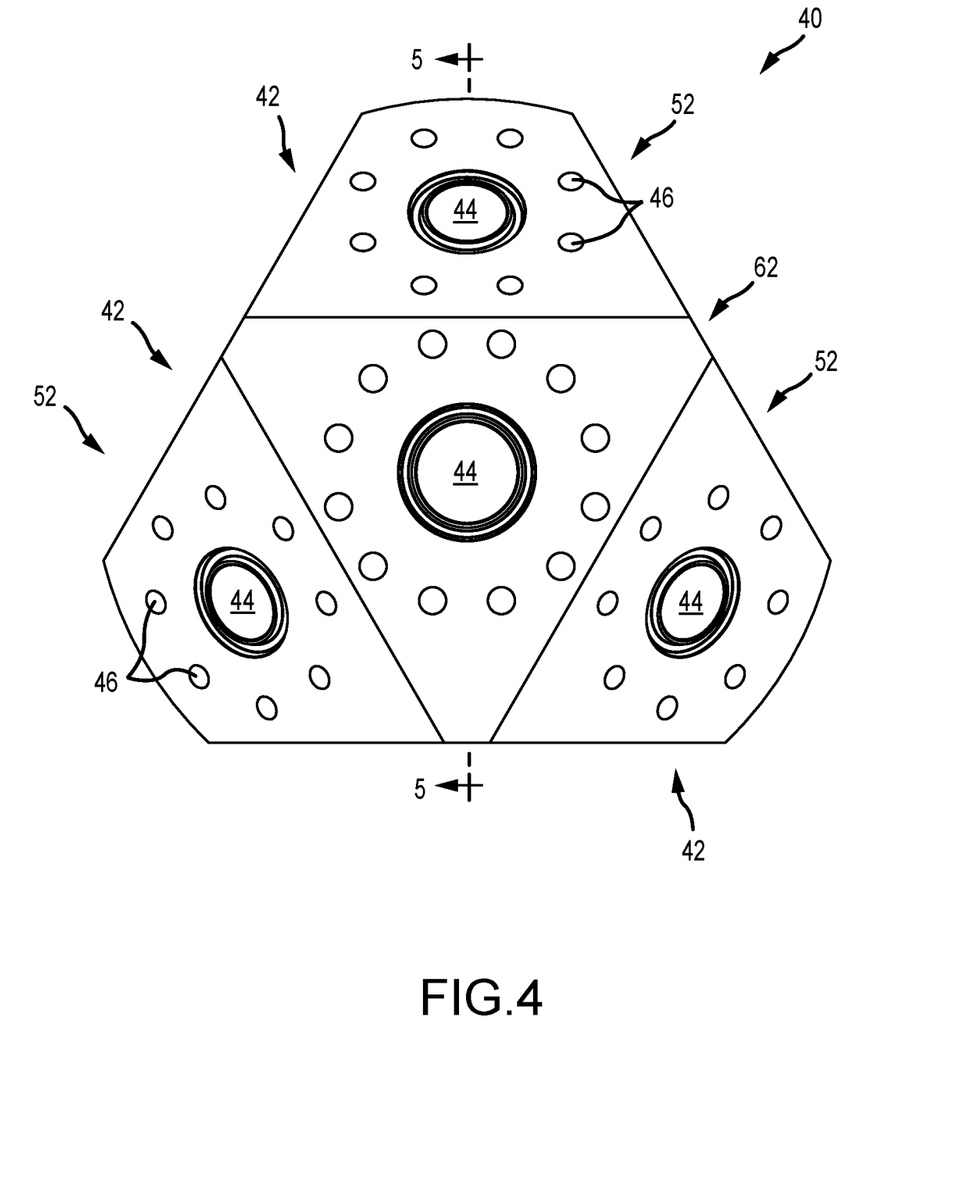
FIG. 4 is a top plan view of an embodiment of a MIFH, in accordance with embodiments of the present disclosure.

FIG. 4 is a top plan view of an embodiment of the MIFH 40. The illustrated embodiment shows three angled faces 52 arranged about the upper face 62. In the illustrated embodiment, the angled faces 52 are not touching one another, however, in other embodiments the angled faces 52 may be oriented such that at least a portion of the angled faces 46 contact one another. The illustrated embodiment includes the inlets 44 on the respective faces 42. As shown, the illustrated inlets 44 are substantially centered on the respective faces 42. In various embodiments, the inlets 44 may be arranged at other positions on the faces 42.

The faces 42 of the illustrated MIFH 40 are arranged to enable coupling of associated components, such as flanged tubulars for directing high-pressure fracturing fluid to the MIFH 40. In the illustrated embodiment, the respective apertures 46 are arranged to enable coupling of the associated components without interference from adjacent faces 42. However, it should be appreciated that in various embodiments each inlet 44 may not be utilized. That is, one or more faces 42 may not be coupled to associated tubular components, and rather may be fitted with a blind or instrumentation, such as a pressure or temperature gauge. With traditional frac heads, having flow that may be classified as unbalanced (e.g., not utilized each inlet) may lead to increased erosion. However, embodiments of the present disclosure are configured to operate with partial flow through the inlets without experiencing increased erosion due to the configuration of the inlets. For example, a fraction of the inlets 44 (e.g., three inlets) may be utilized. Due to the contact and/or mixing within the MIFH 40, the likelihood of erosion may be reduced even with unbalanced flow, which will be described in further detail below.

Figure 5:
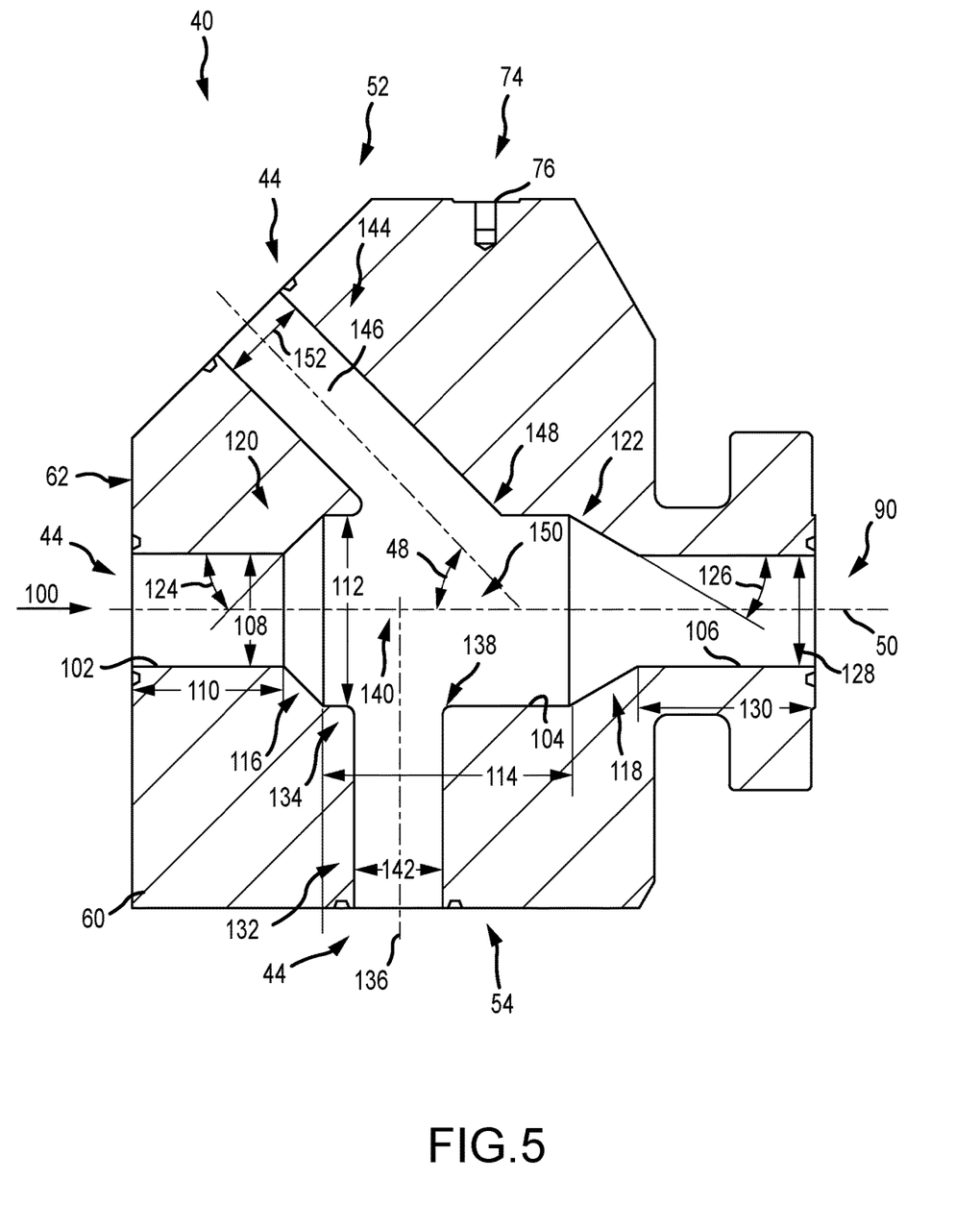
FIG. 5 is a cross-sectional view of an embodiment of a MIFH taken along line 5-5, in accordance with embodiments of the present disclosure.

FIG. 5 is a cross-sectional view of the MIFH 40 taken along line 5-5. In the illustrated embodiment, various passages extend through the body 60 to direct the fracturing fluid toward the wellbore. For reference with the illustrated embodiment, the arrow 100 represents a direction of flow toward the wellbore. It should be appreciated that the arrow 100 is for illustrative purposes only and that in other embodiments different orientations or arrangements may be utilized. Furthermore, the direction represented by the arrow 100 may be referred to herein as the "downstream direction" and flow in the opposite direction may be referred to as the "upstream direction."

The illustrated MIFH 40 includes a first flow passage 102, a second flow passage 104, and a third flow passage 106. Each of the first, second, and third flow passages 102, 104, 106 are arranged coaxially with one another and also along the axis 50. The first flow passage 102 is arranged proximate the upper face 62 and has a first diameter 108 and first length 110. It should be appreciated that the first diameter 108 may be approximately equal to the size of the inlet 44. In the illustrated embodiment, the first diameter 108 may be approximately 5 inches, however it should be appreciated that other diameters may be utilized depending on the inlet 44. Further, the inlet 44 need not be the same size as the first diameter 108. For example, the inlet 44 and the first diameter 108 may be different sizes to adjust a flow velocity. In various embodiments, the first length 110 is approximately 9 inches. However, other lengths may be utilized. In various embodiments, fracturing fluid may be introduced into the body 60 via the inlet 44 on the upper face 62 and the fracturing fluid flows through the first flow passage 102. It should be appreciated that this flow will be substantially coaxial with the axis 50. However, in various embodiments the inlet 44 on the upper face 62 may be utilized to couple instrumentation or other components to the frac tree 12. Furthermore, the first flow passage 102 may fill up with fluid in various embodiments where flow become stagnant or otherwise impinged. It should be appreciated that the first flow passage 102 may receive a direct source of fluid flow from the inlet 44 in various embodiments and that the first flow passage 102 may not receive a direct source of fluid flow in various embodiments.

Continuing along the flow path in the downstream direction 100, the second flow passage 104 has a second diameter 112 and a second length 114. The illustrated second diameter 112 is larger than the first diameter 108. For example, in the illustrated embodiment the second diameter 112 is approximately 9 inches. However, it should be appreciated that other sizes may be utilized and may be adjusted based on manufacturing capabilities. In various embodiments, the second diameter 112 may be larger than the first diameter 108 by a predetermined, specified amount. For instance, the second diameter 112 may be approximately 20 percent larger than the first diameter 108, approximately 30 percent larger than the first diameter 108, approximately 40 percent larger than the first diameter 108, approximately 50 percent larger than the first diameter 180, approximately 60 percent larger than the first diameter 108, approximately 70 percent larger than the first diameter 108, approximately 80 percent larger than the first diameter 108, or any other reasonable size larger. Further, the second diameter 112 may be approximately 20 percent to 40 percent larger than the first diameter 108, approximately 40 percent to 60 percent larger than the first diameter 108, approximately 60 percent to 80 percent larger than the first diameter 108, or any other reasonable range. As will be appreciated, increasing the diameter of the second flow passage 104 relative to the first flow passage 102 will decrease a velocity of the fluid flowing through the second flow passage 104, due to the increased cross-sectional flow area. Accordingly, erosion may be reduced. The illustrated second length 114 is approximately 13 inches, however other sizes may be utilized. The illustrated second flow passage 104 includes a pair of transitions 116, 118 at a first end 120 and a second end 122, respectively. The transitions 116, 118 are utilized to direct the fluid flow to a different diameter portion. In various embodiments, the first, second, and third flow passages 102, 104, 106 form a continuous, substantially cylindrical and symmetric flow passage extending through the MIFH 40. That is, an interior surface of the flow passages 102, 104, 106 may be one continuous surface extending along the MIFH 40. The transitions are arranged at respective angles 124, 126 with respect to the axis 50. The illustrated angle 124 of the transition 116 is approximately 45 degrees. However, it should be appreciated that the angle 124 may be any reasonable amount, such as 15 degrees, 20 degrees, 25 degrees, 30 degrees, 35 degrees, 40 degrees, 50 degrees, 55 degrees, 60 degrees, or any other angle. The illustrated angle 126 of the transition 118 is approximately 30 degrees. However, it should be appreciated that the angle 126 may be any reasonable amount, such as 15 degrees, 20 degrees, 25 degrees, 35 degrees, 40 degrees, 45 degrees, 50 degrees, 55 degrees, 60 degrees, or any other angle. As will be described in detail below, mixing of fluids from the respective inlets 44 on the faces 42 may substantially occur within the second flow passage 104. The illustrated transitions are utilized to adjust the velocity of the respective fluid flows by changing the cross-sectional flow areas. As will be appreciated, by gradually adjusting the cross-sectional flow area, ridges or edges that may be subjected to high stresses may be eliminated. It should be appreciated that in various embodiments the angles 124, 126 may be the same or different from one another. Furthermore, the angles 124, 126 may be particularly selected based on expected flow rates and the like.

The third flow passage 106 is arranged downstream of the second flow passage 104 and receives the fluid flow after the fluid passes through the transition 118. The illustrated third flow passage 106 has a third diameter 128, which is smaller than the second diameter 112 in the illustrated embodiment. In various embodiments, the first and third diameters 108, 128 are substantially equal to one another and smaller than the second diameter 112. However, in embodiments the first and third diameters 108, 128 are not equal. The third flow passage 106 further has a third length 130, which extends to the outlet 90 to direct fluid out of the MIFH 40. In the illustrated embodiment, the third length 130 is approximately 8 inches.

As described above, the MIFH 40 includes the faces 42 having the inlets 44 for directing fracturing fluid into the MIFH 40. The illustrated embodiment includes the vertical face 54 and the angled face 52, each having respective inlets 44. Turning to the inlet 44 of the vertical face 54, an first inlet channel 132 extends through the body 60 and terminates at an outlet 134 at the second flow passage 104. The first inlet channel 132 includes an axis 136 extending therethrough and arranged substantially perpendicular to the axis 50. As described above, in various embodiments the vertical face 54 is positioned substantially parallel to the axis 50 and as a result the inlet 44 directs the fluid into the body 60 substantially perpendicular to the axis 50. In the illustrated embodiment, the outlet 134 includes rounded edges 138. The rounded edges 138 may reduce potential erosion as the fluid turns from the first inlet channel 132 and into the second flow passage 104. In various embodiments, at least a portion of the flow from the first inlet channel 132 may turn in the direction 100. As shown, the axis 136 intersects the second flow passage 104 at a first location 140. The first location 140 is downstream of the transition 116 and upstream of the transition 118. In various embodiments, the first location 140 is arranged at approximately 20 percent of the second length 114. However, in various embodiments, the first location 140 may be arranged at approximately 10 percent of the second length 114, approximately 30 percent of the second length 114, approximately 50 percent of the second length 114, or any other reasonable location.

The illustrated first inlet channel 132 has a channel diameter 142 that is less than the second diameter 112. As a result, the velocity of the fluid is reduced as it enters the second flow passage 104 due to the increased cross-sectional flow area. The channel diameter 142 may be approximately equal to the inlet 44 diameter, which is approximately 4 inches in the illustrated embodiment. In various embodiments, the channel diameter 142 is approximately 50 percent of the second diameter 112. However, in various embodiments, the channel diameter 142 may be approximately 20 percent of the second diameter 112, approximately 30 percent of the second diameter 112, approximately 40 percent of the second diameter 112, approximately 60 percent of the second diameter 112, or any other reasonable size.

Furthermore, FIG. 5 illustrates a second inlet channel 144 extending from the inlet 44 of the angled face 52. The first inlet channel 144 includes an axis 146 extending therethrough and intersecting the axis 50 at the angle 48. In the illustrated embodiment, the angle 48 is approximately 45 degrees. However, it should be appreciated that the angle 48 may be any reasonable amount, such as 15 degrees, 20 degrees, 25 degrees, 30 degrees, 35 degrees, 40 degrees, 50 degrees, 55 degrees, 60 degrees, or any other angle. The second inlet channel 144 intersects the second flow passage 104 at an outlet 148 and extends into the second flow channel at a second location 150, which is downstream of the first location 140 in the illustrated embodiment. The second location 150 is downstream of the transition 116 and upstream of the transition 118. In various embodiments, the second location 150 is arranged at approximately 30 percent of the second length 114. However, in various embodiments, the second location 150 may be arranged at approximately 10 percent of the second length 114, approximately 20 percent of the second length 114, approximately 40 percent of the second length 114, or any other reasonable location. The second inlet channel 144 further has a second channel diameter 152, which may be substantially equal to the first channel diameter 142. In the illustrated embodiment, the second channel diameter 152 is approximately equal to the associated inlet 44, which is approximately 4 inches in diameter. It should be appreciated that in various embodiments the channel diameters 142, 152 may not be equal. However, having the channel diameters 142, 152 substantially equal facilitates balancing the flow into the MIFH 40. For example, substantially equal channel diameters 142, 152 will have substantially equal cross-sectional flow areas, and if the fluid is injected at substantially the same pressure, may have substantially equal flow rates. However, as described above, in various embodiments the MIFH 40 may be configured to operate with unbalanced flow. That is, flow may be introduced into a fraction of the available inlets 44. Due to the configuration of the MIFH 40 in which the various flows meet at an angle within the second flow passage 104, unbalanced flow may be utilized without increasing the likelihood of erosion.

Figure 6:
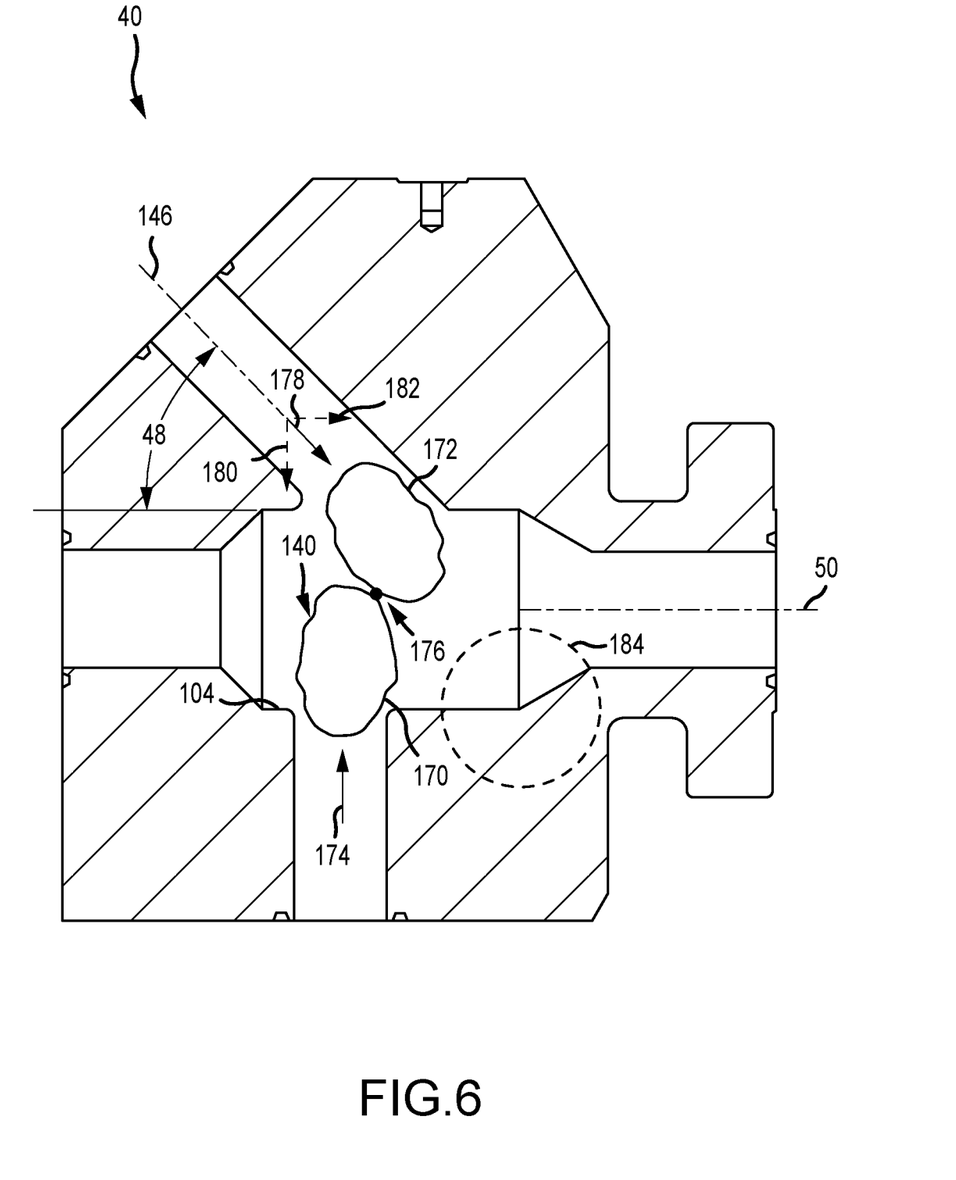
FIG. 6 is a schematic cross-sectional view of an embodiment of a fluid flow through a MIFH, in accordance with embodiments of the present disclosure.

FIG. 6 is a schematic cross-sectional view of an embodiment of the MIFH 40 illustrating flow into the second flow passage 104. In the illustrated embodiment, first and second fluid flows 170, 172 are illustrated for reference. It should be appreciated that the reference fluid flows 170, 172 are not necessarily representative of how the fluid enters the MIFH 40. As shown, the first fluid flow 170 flows into the second flow passage 104 along a first vector 174 that is substantially perpendicular to the axis 50. The first fluid flow 170 enters the second flow passage 104 at approximately the first location 140. In the illustrated embodiment, the first fluid flow 170 contacts the second fluid flow 172 at approximately a mixing point 176. The second fluid flow 172 flows into the second flow passage 104 along a second vector 178. It should be appreciated that the second vector 178 is at the angle 48, and therefore includes a horizontal component 180 and a vertical component 182. In the illustrated embodiment, the mixing point 176 facilitates mixing at different planes within the second flow passage 104. That is, the mixing point 176 is not aligned with the first vector 174 or the second vector 178. As will be described below, the interaction of the fluid flows 170, 172 at the mixing point 176 dissipates energy from the second fluid flow 172, which may reduce erosion within with MIFH 40.

As described in detail above, traditional fracking heads may experience erosion. The area 184 may be prone to erosion due impingement from the second fluid flow 172. However, as shown in the illustrated embodiment, energy from the second fluid flow 172 is dissipated within the second flow passage 104 at the mixing point 176 due to the interaction between the first fluid flow 170 and the second fluid flow 172. In other words, the first vector 174 may at least partially cancel out energy associated with the second vector 178, for example, the horizontal component 180. As a result, there is less energy contacting the body 60 at the area 184, thereby reducing the likelihood of erosion and failure of the MIFH 40.

Figure 7:
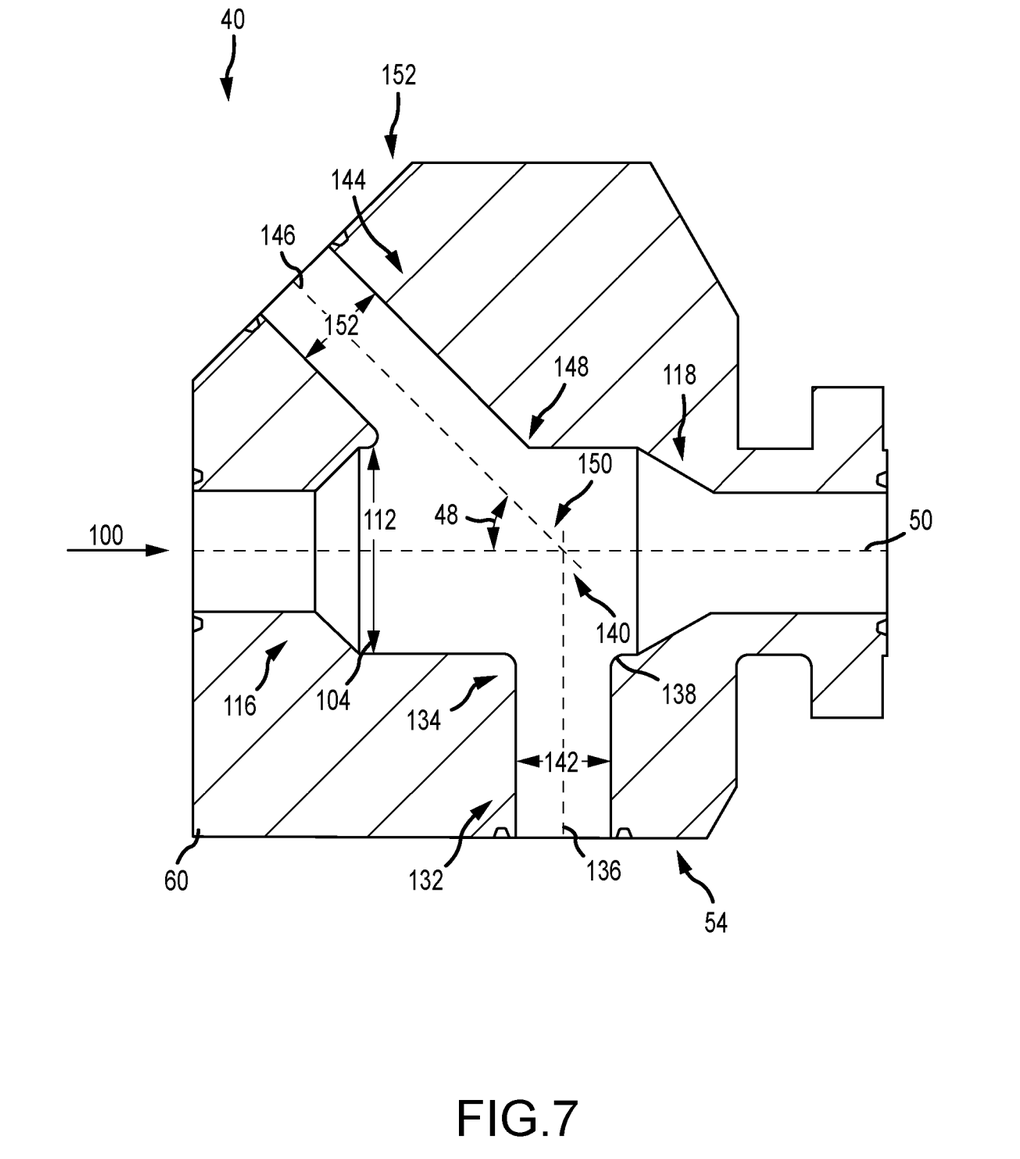
FIG. 7 is a cross-sectional view of an embodiment of a MIFH taken along line 5-5, in accordance with embodiments of the present disclosure.

FIG. 7 is a cross-sectional view of an embodiment of the MIFH 40. The embodiment illustrated in FIG. 7 differs from the embodiment illustrated in FIG. 5 at least partially due to the arrangement of the first and second inlet channels 132, 144. In the illustrated embodiment, the outlet 134 of the first inlet channel 132 is downstream of the outlet 148 of the second inlet channel 144. As a result, as illustrated by the axes 136, 146, the flow paths of the first and second inlet channels 132, 144 intersect at substantially the same location.

As described above with respect to FIG. 5, the first inlet channel 132 extends through the body 60 from the vertical face 54 and includes the outlet 134 into the second flow passage 104. The first inlet channel 132 further includes the axis 136, which is substantially perpendicular to the axis 50. Moreover, the first inlet channel 132 includes the rounded edge 138 at the outlet 134. In various embodiments, the first location 140 is further downstream along the second length 114 in the embodiment shown in FIG. 7 than the embodiment shown in FIG. 5. The first location 140 is downstream of the transition 116 and upstream of the transition 118. In various embodiments, the first location 140 is arranged at approximately 80 percent of the second length 114. However, in various embodiments, the first location 140 may be arranged at approximately 60 percent of the second length 114, approximately 70 percent of the second length 114, approximately 90 percent of the second length 114, or any other reasonable location.

The illustrated embodiment further includes the second inlet channel 144 extending through the angled face 52 at the angle 48. The axis 146 is illustrated as extending through the second flow passage 104 and intersecting with the axis 136. As will be described below, the fluid flows from each respective channel 132, 144 may interact at the mixing point 176 to dissipate at least a portion of the energy from the fluid in the second inlet channel 144, thereby decreasing erosion in the area 184. The outlet 148 to the second inlet channel 144 is upstream relative to the outlet 134 of the first inlet channel 132 and extends to the second location 150. The second location 150 is downstream of the transition 116 and upstream of the transition 118. In various embodiments, the second location 150 is arranged at approximately 20 percent of the second length 114. However, in various embodiments, the second location 150 may be arranged at approximately 10 percent of the second length 114, approximately 30 percent of the second length 114, approximately 50 percent of the second length 114, or any other reasonable location.

The illustrated first inlet channel 132 has the channel diameter 142 that is less than the second diameter 112. As a result, the velocity of the fluid is reduced as it enters the second flow passage 104 due to the increased cross-sectional flow area. In various embodiments, the channel diameter 142 is approximately 50 percent of the second diameter 112. However, in various embodiments, the channel diameter 142 may be approximately 20 percent of the second diameter 112, approximately 30 percent of the second diameter 112, approximately 40 percent of the second diameter 112, approximately 60 percent of the second diameter 112, or any other reasonable size. Further, the second inlet channel 144 has the second channel diameter 152, which may also be less than the second diameter 112. In various embodiments, the first channel diameter 142 is substantially equal to the second channel diameter 152. However, in other embodiments, the second channel diameter 152 may be larger or smaller than the first channel diameter 142.

Figure 8:
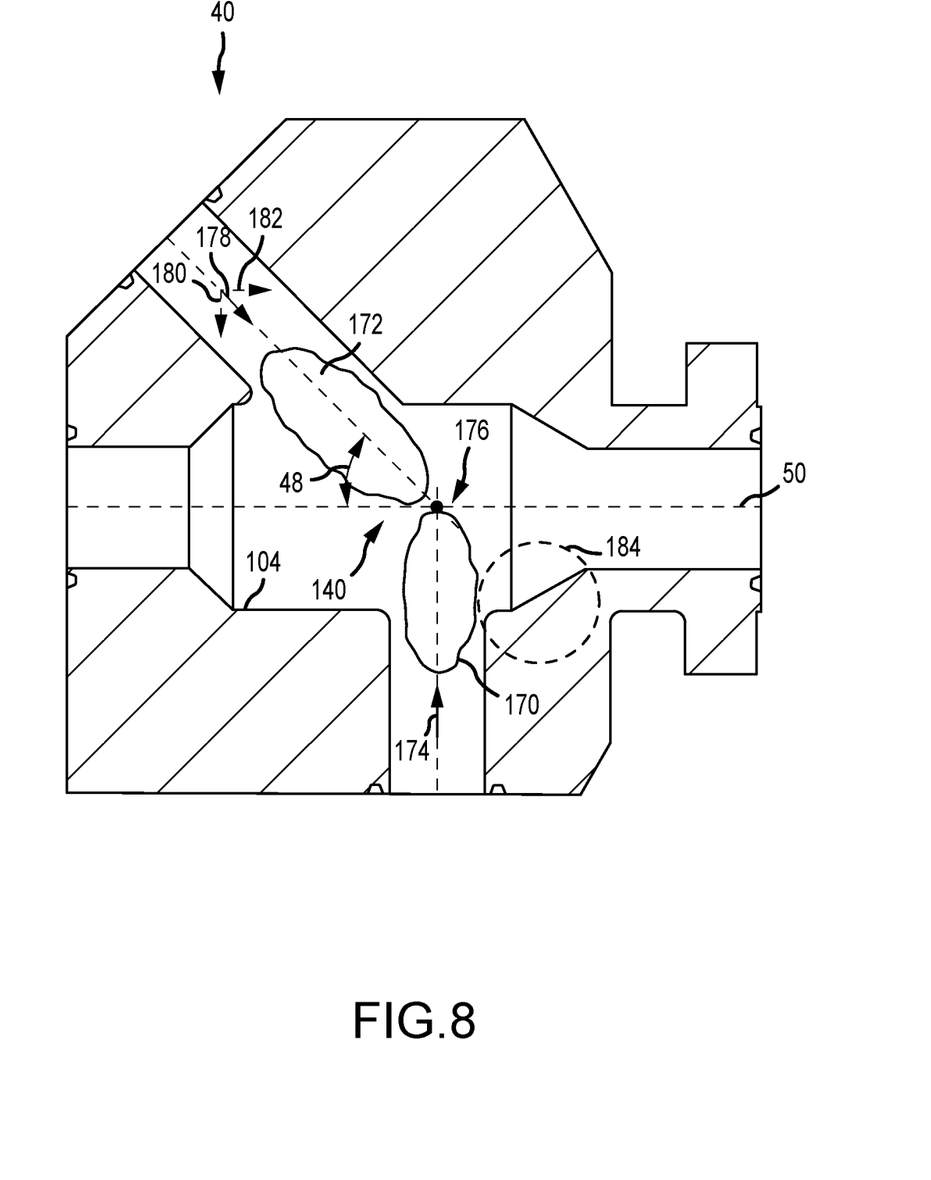
FIG. 8 is a schematic cross-sectional view of an embodiment of a fluid flow through a MIFH, in accordance with embodiments of the present disclosure.

FIG. 8 is a schematic cross-sectional view of an embodiment of the MIFH 40 illustrating flow into the second flow passage 104. In the illustrated embodiment, first and second fluid flows 170, 172 are illustrated for reference. It should be appreciated that the reference fluid flows 170, 172 are not necessarily representative of how the fluid enters the MIFH 40. As shown, the first fluid flow 170 flows into the second flow passage 104 along the first vector 174 that is substantially perpendicular to the axis 50. The first fluid flow 170 enters the second flow passage 104 at approximately the first location 140. In the illustrated embodiment, the first fluid flow 170 contacts the second fluid flow 172 at approximately the mixing point 176. The second fluid flow 172 flows into the second flow passage 104 along the second vector 178. It should be appreciated that the second vector 178 is at the angle 48, and therefore includes the horizontal component 180 and the vertical component 182. As will be described below, the interaction of the fluid flows 170, 172 at the mixing point 176 dissipates energy from the second fluid flow 172, which may reduce erosion within with MIFH 40.

As described in detail above, traditional fracking heads may experience erosion. The area 184 may be prone to erosion due impingement from the second fluid flow 172. However, as shown in the illustrated embodiment, energy from the second fluid flow 172 is dissipated within the second flow passage 104 at the mixing point 176 due to the interaction between the first fluid flow 170 and the second fluid flow 172. In other words, the first vector 174 may at least partially cancel out energy associated with the second vector 178, for example, the horizontal component 180. As a result, there is less energy associated with the fluid contacting the body 60 at the area 184, thereby reducing the likelihood of erosion and failure of the MIFH 40.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A multi-inlet fracturing head (MIFH) for directing a high pressure fracturing fluid into a wellbore, the MIFH comprising:
   a first inlet channel extending through a body of the MIFH for directing fluid into a first flow passage;
   a second inlet channel extending through the body of the MIFH for directing fluid into the first flow passage;
   a second flow passage downstream of the first flow passage when the high pressure fluid is directed from the first flow passage into the wellbore; and
   a transition between the first flow passage and the second flow passage, the transition gradually reducing a difference in diameter between the first flow passage and the second flow passage;
   wherein the first and second inlet channels intersect a longitudinal axis of the MIFH at different vertical heights, and are arranged at different angles with respect to the longitudinal axis of the MIFH.

2. The MIFH of claim 1, wherein the MIFH is adapted to couple to a fracturing tree fluidly coupled to the wellbore, the MIFH receiving the high pressure fracturing fluid from a source and directing the high pressure fracturing fluid into the wellbore.

3. The MIFH of claim 1, wherein an outlet of the first inlet channel is upstream of an outlet of the second inlet channel when the high pressure fluid is directed from the first and second inlet channels into the wellbore.

4. The MIFH of claim 1, wherein an outlet of the first inlet channel is downstream of an outlet of the second inlet channel when the high pressure fluid is directed from the first and second inlet channels into the wellbore.

5. The MIFH of claim 1, wherein the first inlet channel and the second inlet channel direct the high pressure fluid toward a mixing point within the first flow passage.

6. The MIFH of claim 1, wherein the first inlet channel is coupled to a first opening arranged on a first face, arranged at a first face angle with respect to the longitudinal axis and the second inlet channel is coupled to a second opening arranged on a second face, arranged at a second face angle with respect to the longitudinal axis, the first face angle being different than the second face angle.

7. A multi-inlet fracturing head (MIFH) for directing a high pressure fracturing fluid into a wellbore, the MIFH comprising:
   a plurality of angled faces, forming at least a portion of a body of the MIFH, at an angle relative to a longitudinal axis of the MIFH, wherein at least one angled inlet is arranged on at least one angled face of the plurality of angled faces;
   a plurality of vertical faces, forming at least a portion of the body of the MIFH, positioned radially about the axis, wherein at least one vertical inlet is arranged on at least one vertical face of the plurality of vertical faces, and a vertical face of the plurality of vertical faces is arranged at least partially between adjacent angled faces of the plurality of angled faces; and
   a flow path within the body of the MIFH, the flow path receiving the fluid from the angled inlet and the vertical inlet, wherein a first fluid flow from the vertical inlet contacts a second fluid flow from the angled inlet within the flow path.

8. The MIFH of claim 7, wherein the angled inlet is arranged vertically higher than the vertical inlet.

9. The MIFH of claim 7, wherein a first center line of the angled inlet intersects the flow path vertically higher than a second center line of the vertical inlet.

10. The MIFH of claim 7, further comprising:
    a first flow path upstream of the flow path when the high pressure fluid is directed from the angled inlet and the vertical inlet into the wellbore;
    a first transition between the first flow path and the flow path, wherein the first transition is at a first transition angle relative to the longitudinal axis;

a second flow path downstream of the flow path when the high pressure fluid is directed from the angled inlet and the vertical inlet into the wellbore; and a second transition between the second flow path and the flow path, wherein the second transition is at a second transition angle relative to the longitudinal axis.

11. The MIFH of claim 10, wherein the first transition angle and the second transition angle are not equal.

12. The MIFH of claim 7, wherein the first fluid flow contacts the second fluid flow at a mixing point to dissipate energy from the second fluid flow and block at least a portion of the second fluid flow from impinging on the body of the MIFH.

13. A multi-inlet fracturing head (MIFH) for directing a high pressure fracturing fluid into a wellbore, the MIFH comprising:

a first inlet channel extending through a body of the MIFH, the first inlet channel being substantially perpendicular to a longitudinal axis of the MIFH and directing fluid into a first flow passage of the MIFH; and a second inlet channel extending through the body of the MIFH, the second inlet channel being at an angle relative to the longitudinal axis and directing fluid into the first flow passage of the MIFH;

wherein respective center lines of the first and second inlet channels intersect the axis of the MIFH at different vertical heights, the first inlet channel is coupled to a first opening arranged on a first face, arranged at a first face angle with respect to the longitudinal axis and the second inlet channel is coupled to a second opening arranged on a second face, arranged at a second face angle with respect to the longitudinal axis, the first face angle being different than the second face angle.

14. The MIFH of claim 13, wherein an outlet of the first inlet channel is upstream of an outlet of the second inlet channel when the high pressure fluid is directed from the first and second inlet channels into the wellbore.

15. The MIFH of claim 13, wherein an outlet of the first inlet channel is downstream of an outlet of the second inlet channel when the high pressure fluid is directed from the first and second inlet channels into the wellbore.

16. The MIFH of claim 13, wherein the first inlet channel and the second inlet channel directed the high pressure fluid toward a mixing point within the first flow passage.

17. The MIFH of claim 13, further comprising:

a second flow passage downstream of the first flow passage when the high pressure fluid is directed from the first flow passage into the wellbore; and a transition between the first flow passage and the second flow passage, the transition gradually reducing a difference in diameter between the first flow passage and the second flow passage.

* * * * *